United States Patent
Chang et al.

(10) Patent No.: US 8,931,312 B2
(45) Date of Patent: *Jan. 13, 2015

(54) DRUM-TYPE WASHING MACHINE AND BEARING HOUSING STRUCTURE THEREOF

(75) Inventors: Jae Won Chang, Kunpo-si (KR); Hee Tae Lim, Buchun-si (KR); Si Moon Jeon, Seoul (KR); Kyeong Hwan Kim, Seoul (KR); Hyun Seok Seo, Inchun-si (KR)

(73) Assignee: LG Electronics Inc., Seoul (KR)

( * ) Notice: Subject to any disclaimer, the term of this patent is extended or adjusted under 35 U.S.C. 154(b) by 268 days.

This patent is subject to a terminal disclaimer.

(21) Appl. No.: 13/239,538

(22) Filed: Sep. 22, 2011

(65) Prior Publication Data

US 2012/0047966 A1 Mar. 1, 2012

Related U.S. Application Data

(63) Continuation of application No. 12/940,096, filed on Nov. 5, 2010, which is a continuation of application No. 12/198,269, filed on Aug. 26, 2008, now Pat. No. 8,434,334, which is a continuation of application No. 11/165,332, filed on Jun. 24, 2005, now Pat. No. 7,607,326.

(30) Foreign Application Priority Data

Jul. 20, 2004 (KR) .................................. 2004-56258

(51) Int. Cl.
- *D06F 37/22* (2006.01)
- *D06F 37/26* (2006.01)

(52) U.S. Cl.
CPC .............. *D06F 37/22* (2013.01); *D06F 37/269* (2013.01)

USPC .................................. 68/23.1; 68/24; 68/140

(58) Field of Classification Search
CPC ........................................................ D06F 37/22
USPC ........................................ 68/24, 58, 140, 23.1
See application file for complete search history.

(56) References Cited

U.S. PATENT DOCUMENTS

| 912,038 A | 2/1909 | Seifert |
| 1,077,043 A | 10/1913 | Darrow |

(Continued)

FOREIGN PATENT DOCUMENTS

| CN | 2423308 Y | 3/2001 |
| CN | 1293276 | 5/2001 |

(Continued)

OTHER PUBLICATIONS

U.S. Office Action dated Dec. 30, 2005 issued in U.S. Appl. No. 10/461,451.

(Continued)

*Primary Examiner* — Joseph L Perrin
(74) *Attorney, Agent, or Firm* — Ked & Associates, LLP

(57) ABSTRACT

A drum type washing machine is provided. The washing machine may include a tub, a drum, a motor rotating the drum, bearing housings housing bearings to support a rotation shaft, a suspension connected to the bearing housings and a cabinet to mitigate vibration, a bracket coupled to the bearing housings, and a gasket installed between the bracket and the tub. Such an arrangement may allow volumes of the tub and the drum may be increased without increasing the volume of the cabinet.

11 Claims, 6 Drawing Sheets

(56) References Cited

U.S. PATENT DOCUMENTS

| | | | |
|---|---|---|---|
| 1,470,245 A | 10/1923 | Slider | |
| 1,611,865 A | 12/1926 | Ahlm | |
| 1,611,895 A | 12/1926 | Dienner | |
| 1,657,181 A | 1/1928 | Sando | |
| 1,787,427 A | 1/1931 | Eckhard | 68/140 |
| 2,033,630 A | 3/1936 | Gould | |
| 2,089,066 A | 8/1937 | Morrill | 248/26 |
| 2,096,649 A | 10/1937 | Rasanen | |
| 2,152,458 A | 3/1939 | Bergman | 172/36 |
| 2,153,418 A | 4/1939 | Haberstump | 286/5 |
| 2,156,992 A | 5/1939 | Knapp | |
| 2,165,884 A | 7/1939 | Chamberlin et al. | 8/159 |
| 2,191,607 A | 2/1940 | Chamberlin et al. | 237/20 |
| 2,217,351 A | 10/1940 | Soderquist | |
| 2,225,144 A | 12/1940 | Bassett, Jr. | |
| 2,230,345 A | 2/1941 | Bradbury | |
| 2,278,911 A | 4/1942 | Breckenridge | |
| 2,296,257 A | 9/1942 | Breckenridge | 68/24 |
| 2,296,261 A | 9/1942 | Breckenridge et al. | 68/24 |
| 2,296,267 A | 9/1942 | Baird | 68/23 |
| 2,323,765 A | 7/1943 | Haberstump | 68/13 |
| 2,331,897 A | 10/1943 | Dyer | |
| 2,356,816 A | 8/1944 | Breckenridge et al. | 68/12 |
| 2,356,818 A | 8/1944 | Bruckman | 68/24 |
| 2,389,774 A | 11/1945 | Haberstump | 220/10 |
| 2,408,509 A | 10/1946 | Clark | 68/23 |
| 2,434,476 A | 1/1948 | Wales | 68/19 |
| 2,498,181 A | 2/1950 | Reiter | 259/81 |
| 2,509,516 A | 5/1950 | Murphy | 29/215 |
| 2,510,836 A | 6/1950 | Russell et al. | 68/24 |
| 2,521,578 A | 9/1950 | Haberstump | 68/19 |
| 2,526,002 A | 10/1950 | Brotman | 68/140 |
| 2,526,048 A | 10/1950 | Russell | 68/24 |
| 2,526,444 A | 10/1950 | Woodson | |
| 2,527,239 A | 10/1950 | Woodson | 68/23 |
| 2,541,166 A | 2/1951 | Leef | 68/140 |
| 2,542,509 A | 2/1951 | Goriup | 68/153 |
| 2,555,269 A | 5/1951 | Chamberlin | |
| 2,556,490 A | 6/1951 | Chamberlin | 8/159 |
| 2,565,604 A | 8/1951 | Geiger | 68/140 |
| 2,579,472 A | 12/1951 | Chamberlin et al. | 68/24 |
| 2,579,836 A | 12/1951 | Lee et al. | 260/26 |
| 2,589,284 A | 3/1952 | O'Neil | 34/77 |
| 2,593,752 A | 4/1952 | Haberstump | 68/61 |
| 2,615,320 A | 10/1952 | Belaieff | 68/24 |
| 2,620,070 A | 12/1952 | Dodge | 210/365 |
| 2,629,245 A | 2/1953 | Chamberlin | |
| 2,634,595 A | 4/1953 | Olson | |
| 2,644,326 A | 7/1953 | Worst | 68/23 |
| 2,652,708 A | 9/1953 | Rimsha et al. | |
| 2,656,700 A | 10/1953 | Smith | 68/23 |
| 2,664,326 A | 12/1953 | Kuzmick | |
| 2,711,297 A | 6/1955 | Thiele | 248/18 |
| 2,717,135 A | 9/1955 | Douglas | 248/20 |
| 2,737,799 A | 3/1956 | Knipmeyer | |
| 2,757,531 A | 8/1956 | Fox | |
| 2,758,685 A | 8/1956 | Sisson | 192/3.5 |
| 2,774,621 A | 12/1956 | Kilbourne, Jr. | 228/23 |
| 2,785,557 A | 3/1957 | Stilwell, Jr. | 68/12 |
| 2,836,046 A | 5/1958 | Smith | 68/24 |
| 2,843,314 A | 7/1958 | Hansen | 230/232 |
| 2,844,225 A | 7/1958 | Hubbard et al. | |
| 2,844,255 A | 7/1958 | Cavenah et al. | |
| 2,859,877 A | 11/1958 | Sisson | |
| 2,873,599 A | 2/1959 | Buechler | 68/24 |
| 2,882,706 A | 4/1959 | Brucken | 68/23 |
| 2,893,135 A | 7/1959 | Smith | |
| 2,895,319 A | 7/1959 | Rochefort | 68/3 |
| 2,908,871 A | 10/1959 | McKay | 331/108 |
| 2,930,217 A | 3/1960 | Rehmke | 68/24 |
| 2,937,516 A | 5/1960 | Czaika | |
| 2,957,330 A | 10/1960 | Cline | |
| 2,959,966 A | 11/1960 | Bochan | |
| 2,972,877 A | 2/1961 | Platt | 68/18 |
| 2,975,528 A | 3/1961 | Shewmon | |
| 2,981,094 A | 4/1961 | Lehmann et al. | |
| 2,984,094 A | 5/1961 | Belaieff | 68/24 |
| 2,986,914 A | 6/1961 | Brucken | 68/12 |
| 2,987,190 A | 6/1961 | Bochan | |
| 2,990,706 A | 7/1961 | Bochan | 68/12 |
| 2,995,023 A | 8/1961 | Douglas | 68/131 |
| 2,995,918 A | 8/1961 | Neidenthan et al. | |
| 2,987,189 A | 9/1961 | Evjen | |
| 3,048,026 A | 8/1962 | Bochan et al. | 68/12.09 |
| 3,058,331 A | 10/1962 | Anthony | |
| 3,066,522 A | 12/1962 | Steinmüller | 68/24 |
| 3,073,668 A | 1/1963 | Rothenberger | |
| 3,089,326 A | 5/1963 | Belaieff | 68/24 |
| 3,098,581 A | 7/1963 | Marsilio | 220/46 |
| 3,135,688 A | 6/1964 | Compans et al. | |
| 3,153,951 A | 10/1964 | Whelan | 74/665 |
| 3,178,916 A | 4/1965 | Belaieff et al. | 68/24 |
| 3,197,983 A | 8/1965 | Ilmer | 68/24 |
| 3,206,267 A | 9/1965 | Gruner et al. | 312/228 |
| 3,248,908 A | 5/1966 | Pope | |
| 3,257,830 A | 6/1966 | Shelton | 68/133 |
| 3,273,361 A | 9/1966 | Smith | 68/12 |
| 3,280,603 A | 10/1966 | Schwamm | |
| 3,333,444 A | 8/1967 | Bochan | 68/208 |
| 3,356,222 A | 12/1967 | Belaieff | 210/363 |
| 3,362,198 A | 1/1968 | Barito | |
| 3,389,881 A | 6/1968 | Stelwagen | 248/18 |
| 3,391,469 A | 7/1968 | Reeder | 34/58 |
| 3,459,461 A | 8/1969 | Bannon, Jr. | 213/214 |
| 3,477,259 A | 11/1969 | Barnish et al. | 68/23.1 |
| 3,503,228 A | 3/1970 | Lake | |
| 3,509,742 A | 5/1970 | Bauer | 68/23.1 |
| 3,531,954 A | 10/1970 | Krupsky | 68/18 |
| 3,742,738 A | 7/1973 | Frotriede | |
| 3,783,653 A | 1/1974 | Haerick | |
| 3,799,348 A | 3/1974 | Mazza | |
| 3,927,542 A | 12/1975 | de Hedouville et al. | 68/17 |
| 3,952,557 A | 4/1976 | Bochan | |
| 4,114,406 A | 9/1978 | Horowitz et al. | 68/24 |
| 4,295,387 A | 10/1981 | Zhivotov et al. | 74/573 |
| 4,321,302 A | 3/1982 | Umeki et al. | |
| 4,327,302 A | 4/1982 | Hershberger | |
| 4,412,390 A | 11/1983 | Grant | 34/58 |
| 4,437,325 A | 3/1984 | Hershberger | |
| 4,446,706 A | 5/1984 | Hartwig | 68/24 |
| 4,498,181 A | 2/1985 | Menown et al. | 372/38 |
| 4,618,193 A | 10/1986 | Cuthbert et al. | 312/264 |
| 4,771,253 A | 9/1988 | Sasaki et al. | |
| 4,819,460 A | 4/1989 | Obradovic | 68/23.7 |
| 4,989,684 A | 2/1991 | Conaway | 180/89.15 |
| 5,038,586 A | 8/1991 | Nukaga et al. | 68/12.01 |
| 5,080,204 A | 1/1992 | Bauer et al. | 188/129 |
| 5,199,690 A | 4/1993 | Marshall | 267/64.25 |
| 5,209,458 A | 5/1993 | Eubank et al. | 254/88 |
| 5,230,229 A | 7/1993 | Stadelmann et al. | 68/23.1 |
| 5,267,456 A | 12/1993 | Nukaga et al. | 68/12.24 |
| 5,280,660 A | 1/1994 | Pellerin et al. | 8/158 |
| 5,327,603 A | 7/1994 | Roh et al. | |
| 5,381,677 A | 1/1995 | Park et al. | |
| 5,433,091 A | 7/1995 | Durazzani et al. | |
| 5,442,937 A | 8/1995 | Kwon | |
| 5,526,657 A | 6/1996 | Johnson | 68/3 |
| 5,546,772 A | 8/1996 | Merlin et al. | |
| 5,548,979 A | 8/1996 | Ryan et al. | |
| 5,570,597 A | 11/1996 | Bongini et al. | |
| 5,657,649 A | 8/1997 | Lim | 68/23.3 |
| 5,678,430 A | 10/1997 | Merlin et al. | |
| 5,709,109 A | 1/1998 | Cho | 68/23.2 |
| 5,711,170 A | 1/1998 | Johnson | 68/3 |
| 5,711,171 A | 1/1998 | Uhlin | 68/4 |
| 5,737,944 A | 4/1998 | Nishimura et al. | |
| 5,768,730 A | 6/1998 | Matsumoto et al. | 8/159 |
| 5,842,358 A | 12/1998 | Koo et al. | |
| 5,862,686 A | 1/1999 | Skrippek | |
| 5,870,905 A | 2/1999 | Imamura et al. | 68/12.04 |
| 5,894,746 A | 4/1999 | Skrippek | |
| 5,907,880 A | 6/1999 | Durazzani et al. | |
| 5,913,951 A | 6/1999 | Herr et al. | 81/158 |
| 5,924,312 A | 7/1999 | Vande Haar | |

(56) References Cited

U.S. PATENT DOCUMENTS

| | | | |
|---|---|---|---|
| 5,927,106 A | 7/1999 | Pellerin | |
| 5,947,136 A | 9/1999 | Abras | |
| 5,961,105 A | 10/1999 | Ehrnsberger et al. | 267/216 |
| 5,979,195 A | 11/1999 | Bestell et al. | 68/23.2 |
| 6,006,553 A | 12/1999 | Lee et al. | |
| 6,032,494 A | 3/2000 | Tanigawa et al. | 68/12.06 |
| 6,122,843 A | 9/2000 | Noguchi et al. | 34/596 |
| 6,148,647 A | 11/2000 | Kabeya et al. | 68/140 |
| 6,343,492 B1 | 2/2002 | Seagar et al. | 68/142 |
| 6,363,756 B1 | 4/2002 | Seagar et al. | 68/210 |
| 6,460,382 B1 | 10/2002 | Kim et al. | 68/140 |
| 6,474,114 B1 | 11/2002 | Ito et al. | 68/140 |
| 6,477,867 B1 | 11/2002 | Collecutt et al. | 68/12.06 |
| 6,481,035 B2 | 11/2002 | Seagar et al. | 81/159 |
| 6,510,715 B1 | 1/2003 | Simsek et al. | 68/12.06 |
| 6,510,716 B1 | 1/2003 | Kim et al. | 68/24 |
| 6,516,638 B1 | 2/2003 | Myerscough | 68/23.1 |
| 6,539,753 B1 | 4/2003 | Ito et al. | 68/3 |
| 6,557,383 B1 | 5/2003 | Ito et al. | 68/23.2 |
| 6,564,594 B1 | 5/2003 | Ito et al. | 68/24 |
| 6,578,225 B2 | 6/2003 | Jönsson | 8/159 |
| 6,578,391 B2 | 6/2003 | Seagar et al. | 68/142 |
| 6,612,138 B2 | 9/2003 | Ryu et al. | |
| 6,626,014 B2 | 9/2003 | Heyder et al. | 68/140 |
| 6,662,682 B2 | 12/2003 | Stalsberg | |
| 6,681,602 B2 | 1/2004 | Heyder et al. | |
| 6,782,722 B2 | 8/2004 | Yokoi et al. | |
| 6,968,632 B2 | 11/2005 | Guinibert et al. | |
| 6,981,395 B2 | 1/2006 | Ryu et al. | 68/17 |
| 7,013,682 B2 | 3/2006 | Sharrow | |
| 7,065,905 B2 | 6/2006 | Guinibert et al. | |
| 7,073,356 B2 | 7/2006 | Nakamura et al. | 68/12.26 |
| 7,117,613 B2 | 10/2006 | Guinibert et al. | |
| 7,225,562 B2 | 6/2007 | Guinibert et al. | |
| 7,249,742 B2 | 7/2007 | Guinibert et al. | |
| 7,257,905 B2 | 8/2007 | Guinibert et al. | |
| 7,334,799 B2 | 2/2008 | O'Hara | 277/361 |
| 7,412,783 B2 | 8/2008 | Guinibert et al. | |
| 7,467,483 B2 | 12/2008 | Guinibert et al. | |
| 7,520,148 B2 | 4/2009 | Choi | |
| 7,536,882 B2 | 5/2009 | Kim et al. | |
| 7,571,625 B2 | 8/2009 | Chang | |
| 7,574,879 B2 | 8/2009 | Chang et al. | |
| 7,607,326 B2 | 10/2009 | Chang et al. | |
| 7,762,007 B2 | 7/2010 | Guinibert et al. | |
| 7,797,971 B2 | 9/2010 | Kawabata et al. | |
| 7,841,220 B2 | 11/2010 | Lim et al. | |
| 7,930,910 B2 | 4/2011 | Chang | |
| 8,156,770 B2 | 4/2012 | Chang | |
| 8,225,628 B2 | 7/2012 | Lim et al. | |
| 8,234,890 B2 | 8/2012 | Lim et al. | |
| 8,302,434 B2 | 11/2012 | Chang | |
| 8,322,170 B2 | 12/2012 | Chang | |
| 8,336,339 B2 | 12/2012 | Chang | |
| 8,336,340 B2 | 12/2012 | Chang | |
| 8,341,983 B2 | 1/2013 | Chang | |
| 8,387,421 B2 | 3/2013 | Chang | |
| 8,616,027 B2 | 12/2013 | Chang | |
| 8,646,292 B2 | 2/2014 | Chang | |
| 8,646,293 B2 | 2/2014 | Chang | |
| 8,677,787 B2 | 3/2014 | Chang et al. | |
| 2002/0000108 A1 | 1/2002 | Heyder et al. | |
| 2002/0014095 A1 | 2/2002 | Seagar et al. | |
| 2002/0042957 A1 | 4/2002 | Kim et al. | |
| 2002/0166349 A1 | 11/2002 | Lim et al. | 68/23.7 |
| 2002/0194884 A1 | 12/2002 | Heyder et al. | |
| 2003/0037382 A1 | 2/2003 | Broker | |
| 2003/0056302 A1 | 3/2003 | Broker et al. | 8/159 |
| 2003/0061841 A1 | 4/2003 | Nakamura et al. | |
| 2003/0061842 A1 | 4/2003 | Ryu et al. | |
| 2004/0025544 A1 | 2/2004 | Kim et al. | 68/3 |
| 2004/0031295 A1 | 2/2004 | Choi | 68/24 |
| 2004/0035155 A1 | 2/2004 | Yoon | 68/145 |
| 2004/0123631 A1 | 7/2004 | Chang | 68/23.1 |
| 2004/0129035 A1 | 7/2004 | Chang | 68/23 |
| 2004/0148981 A1 | 8/2004 | Kim et al. | |
| 2004/0163425 A1 | 8/2004 | Kim et al. | |
| 2004/0163428 A1 | 8/2004 | Kim et al. | 68/140 |
| 2004/0237603 A1 | 12/2004 | Kim et al. | 68/15 |
| 2004/0244121 A1 | 12/2004 | Lim et al. | 8/159 |
| 2004/0244168 A1 | 12/2004 | Lee | 29/283.5 |
| 2004/0244438 A1 | 12/2004 | North | |
| 2005/0028564 A1 | 2/2005 | Lee et al. | 68/24 |
| 2005/0188472 A1 | 9/2005 | Park et al. | 8/158 |
| 2005/0274159 A1 | 12/2005 | Jeon et al. | |
| 2006/0010612 A1 | 1/2006 | Kim et al. | 8/158 |
| 2006/0011429 A1 | 1/2006 | Park et al. | 188/322.13 |
| 2006/0016228 A1 | 1/2006 | Chang et al. | 68/23.1 |
| 2006/0254321 A1 | 11/2006 | Lim et al. | |
| 2007/0125135 A1 | 6/2007 | Kim et al. | 69/140 |
| 2007/0227200 A1 | 10/2007 | Kim et al. | 68/140 |

FOREIGN PATENT DOCUMENTS

| | | |
|---|---|---|
| CN | 1332816 A | 1/2002 |
| CN | 1414163 A | 4/2003 |
| CN | 1511997 A | 7/2004 |
| CN | 1515732 A | 7/2004 |
| CN | 1550609 A | 12/2004 |
| CN | 1614123 | 5/2005 |
| DE | 1 095 778 | 12/1960 |
| DE | 1 113 439 | 9/1961 |
| DE | 1 188 547 | 3/1965 |
| DE | 19 12 481 U | 3/1965 |
| DE | 24 01 888 A1 | 7/1975 |
| DE | 24 54 489 A1 | 5/1976 |
| DE | 26 06 589 | 9/1976 |
| DE | 26 33 604 A1 | 2/1978 |
| DE | 27 32 684 A1 | 2/1978 |
| DE | 26 48 116 | 4/1978 |
| DE | 27 46 989 A1 | 4/1978 |
| DE | 26 49 341 | 5/1978 |
| DE | 31 09 641 A1 | 2/1982 |
| DE | 31 34 633 A1 | 8/1982 |
| DE | 34 37 835 A1 | 5/1985 |
| DE | 37 13 921 | 11/1988 |
| DE | 38 11 583 A1 | 10/1989 |
| DE | 39 07 258 A1 | 10/1989 |
| DE | 39 34 434 A1 | 4/1991 |
| DE | 42 39 504 A1 | 5/1994 |
| DE | 43 10 594 A1 | 10/1994 |
| DE | 4 426 900 | 2/1995 |
| DE | 43 30 079 A1 | 3/1995 |
| DE | 198 06 884 | 8/1999 |
| DE | 199 61 780 | 7/2001 |
| DE | 101 54 208 | 6/2002 |
| EP | 0 124 939 B1 | 11/1984 |
| EP | 0 132 805 A1 | 2/1985 |
| EP | 0 212 259 | 3/1987 |
| EP | 0 272 949 B1 | 6/1988 |
| EP | 0 371 926 A1 | 6/1990 |
| EP | 0 405 068 B1 | 1/1991 |
| EP | 0 465 885 | 1/1992 |
| EP | 0 716 177 B1 | 6/1996 |
| EP | 0 750 064 A1 | 12/1996 |
| EP | 0 869 212 | 10/1998 |
| EP | 0 943 720 | 9/1999 |
| EP | 0 969 134 A1 | 1/2000 |
| EP | 0 725 179 B1 | 7/2000 |
| EP | 1 055 765 A1 | 11/2000 |
| EP | 1 079 014 B1 | 2/2001 |
| EP | 1 094 239 B1 | 4/2001 |
| EP | 1 201 810 | 5/2002 |
| EP | 1 386 996 B1 | 2/2004 |
| EP | 1 433 890 B1 | 6/2004 |
| EP | 1 433 891 A2 | 6/2004 |
| EP | 1 455 011 | 9/2004 |
| EP | 1 505 191 A1 | 2/2005 |
| EP | 1 548 170 | 6/2005 |
| EP | 1 605 088 A2 | 12/2005 |
| EP | 1 619 286 | 1/2006 |
| EP | 1 645 678 A2 | 4/2006 |
| EP | 1 688 531 A1 | 8/2006 |
| FR | 2 116 896 | 7/1972 |

(56) References Cited

FOREIGN PATENT DOCUMENTS

| | | |
|---|---|---|
| FR | 2 230 782 | 1/1975 |
| FR | 2 478 151 | 9/1981 |
| FR | 2 511 401 | 2/1983 |
| FR | 2 610 017 | 7/1988 |
| GB | 460019 | 1/1937 |
| GB | 646582 | 11/1950 |
| GB | 1120431 | 7/1968 |
| GB | 1 181 797 | 2/1970 |
| GB | 1 270 950 | 4/1972 |
| GB | 1 353 283 | 5/1974 |
| GB | 2 096 649 A | 10/1982 |
| GB | 2 157 326 A | 10/1985 |
| GB | 2 189 511 | 10/1987 |
| GB | 2 202 867 A | 10/1988 |
| GB | 2 360 296 | 9/2001 |
| JP | 39-21844 U | 7/1962 |
| JP | 48-64179 | 8/1973 |
| JP | 49-135264 | 11/1974 |
| JP | 52-134264 | 11/1977 |
| JP | 54-028470 | 3/1979 |
| JP | 56-116987 A | 9/1981 |
| JP | 57-43792 A | 3/1982 |
| JP | 59-211496 A | 11/1984 |
| JP | 60-190998 | 9/1985 |
| JP | 63-95587 U | 6/1988 |
| JP | 01-230390 | 9/1989 |
| JP | 02-189188 | 7/1990 |
| JP | 03-141988 | 6/1991 |
| JP | 03-88479 U | 9/1991 |
| JP | 04-092697 A | 3/1992 |
| JP | 04-210091 | 7/1992 |
| JP | 04-220291 | 8/1992 |
| JP | 04-236988 A | 8/1992 |
| JP | 04-240488 A | 8/1992 |
| JP | 04-325196 | 11/1992 |
| JP | 04-371194 A | 12/1992 |
| JP | 05-084388 A | 4/1993 |
| JP | 05-084389 | 4/1993 |
| JP | 05-220293 A | 8/1993 |
| JP | 06-079087 A | 3/1994 |
| JP | 09-066185 | 3/1997 |
| JP | 09-182368 | 7/1997 |
| JP | 09-182370 A | 7/1997 |
| JP | 9-313780 | 12/1997 |
| JP | 10-201993 A | 8/1998 |
| JP | 10-263265 | 10/1998 |
| JP | 11-076680 A | 3/1999 |
| JP | 2000-262796 A | 9/2000 |
| JP | 2000-334194 A | 12/2000 |
| JP | 2002-153695 A | 5/2002 |
| JP | 2002-529173 T | 9/2002 |
| JP | 2002-346281 A | 12/2002 |
| JP | 2003-079995 | 3/2003 |
| JP | 2003-230792 A | 8/2003 |
| JP | 2004-513721 | 5/2004 |
| JP | 2004-188204 | 7/2004 |
| JP | 2004-209255 | 7/2004 |
| JP | 2005-198698 | 7/2005 |
| JP | 2006-026408 | 2/2006 |
| JP | 2006-034755 | 2/2006 |
| KR | 10-1999-0066050 A | 8/1999 |
| KR | 10-1999-0079731 A | 11/1999 |
| KR | 10-2000-0075238 A | 12/2000 |
| KR | 10-2001-0009545 A | 2/2001 |
| KR | 2001-0046776 | 6/2001 |
| KR | 10-2004-0011307 A | 2/2004 |
| KR | 10-2004-0026887 | 4/2004 |
| KR | 10-2004-0047223 A | 6/2004 |
| KR | 10-2004-0058999 | 7/2004 |
| KR | 10-2004-0058999 A | 7/2004 |
| KR | 10-2006-0009075 | 1/2006 |
| KR | 10-2006-0028804 | 4/2006 |
| SU | 1181112 A | 9/1986 |
| SU | 1615258 | 12/1990 |
| SU | 1663074 A1 | 7/1991 |
| SU | 1 703 740 | 1/1992 |
| WO | WO 98/29595 A2 | 7/1998 |
| WO | WO 99/35320 | 7/1999 |
| WO | WO 00/28127 | 5/2000 |
| WO | WO 03/097918 | 11/2003 |
| WO | WO 2005/071155 | 8/2005 |

OTHER PUBLICATIONS

U.S. Final Office Action dated Aug. 14, 2006 issued in U.S. Appl. No. 10/461,451.
U.S. Final Office Action dated Dec. 13, 2006 issued in U.S. Appl. No. 10/461,451.
U.S. Office Action dated Jan. 5, 2007 issued in U.S. Appl. No. 11/475,885.
U.S. Office Action dated Apr. 27, 2007 issued in U.S. Appl. No. 10/461,451.
U.S. Office Action dated Jun. 8, 2007 issued in U.S. Appl. No. 11/470,704.
U.S. Office Action dated Nov. 30, 2007 issued in U.S. Appl. No. 11/470,704.
U.S. Final Office Action dated Jul. 17, 2007 issued in U.S. Appl. No. 11/475,885.
U.S. Office Action dated Nov. 19, 2007 issued in U.S. Appl. No. 10/461,451.
U.S. Office Action dated Apr. 1, 2008 issued in U.S. Appl. No. 11/475,885.
U.S. Final Office Action dated May 15, 2008 issued in U.S. Appl. No. 11/470,704.
U.S. Final Office Action dated Jun. 16, 2008 issued in U.S. Appl. No. 10/461,451.
U.S. Office Action dated Sep. 5, 2008 issued in U.S. Appl. No. 11/165,332.
U.S. Office Action dated Sep. 11, 2008 issued in U.S. Appl. No. 11/470,704.
U.S. Final Office Action dated Feb. 25, 2009 issued in U.S. Appl. No. 11/165,332.
U.S. Office Action dated Feb. 25, 2009 issued in U.S. Appl. No. 12/198,269.
Japanese Office Action dated Mar. 2, 2009 issued in Application No. 2004-000478.
Japanese Office Action dated Dec. 18, 2009 issued in Application No. 2004-000478.
U.S. Office Action dated Sep. 21, 2009 issued in U.S. Appl. No. 12/267,457.
U.S. Final Office Action dated Oct. 14, 2009 issued in U.S. Appl. No. 12/198,269.
U.S. Office Action dated Oct. 15, 2009 issued in U.S. Appl. No. 11/529,759.
U.S. Office Action dated Oct. 28, 2009 issued in U.S. Appl. No. 12/230,031.
Chinese Office Action issued in CN Application No. 200710089087.4 dated Jan. 8, 2010.
U.S. Office Action dated Feb. 2, 2010 issued in U.S. Appl. No. 12/198,269.
European Search Report dated Feb. 3, 2010 issued in Application No. 09178918.0.
U.S. Final Office Action dated Mar. 5, 2010 issued in U.S. Appl. No. 12/267,457.
Chinese Office Action dated Mar. 8, 2010 issued in Application No. 200610142200.6.
U.S. Final Office Action dated Mar. 19, 2010 issued in U.S. Appl. No. 11/529,759.
Notice of Opposition dated May 7, 2010 filed in the European Patent Office for European Patent Application No. 05013603.5 (Publication No. EP 1 619 286 B1).
U.S. Final Office Action dated May 14, 2010 issued in U.S. Appl. No. 12/230,031.
Japanese Office Action issued in JP Application No. 2005-204374 dated Jul. 28, 2010.
Japanese Office Action issued in JP Application No. 2006-235745 dated Aug. 3, 2010.

(56) References Cited

OTHER PUBLICATIONS

U.S. Office Action dated Aug. 13, 2010 issued in U.S. Appl. No. 12/639,872.
Notice of Opposition and Opposition Brief filed in EP Application No. 03013411.8 dated Sep. 29, 2010 (Publication No. EP 1 433 890 B1) (full German text and English translation).
U.S. Office Action issued in U.S. Appl. No. 12/797,758 dated Oct. 28, 2010.
European Search Report issued in EP Application No. 10012467 dated Nov. 25, 2010.
U.S. Office Action issued in U.S. Appl. No. 12/639,859 dated Dec. 9, 2010.
U.S. Office Action issued in U.S. Appl. No. 12/940,138 dated Dec. 16, 2010.
U.S. Office Action issued in U.S. Appl. No. 12/639,894 dated Dec. 23, 2010.
U.S. Office Action issued in U.S. Appl. No. 12/985,389 dated Mar. 16, 2011.
Final U.S. Office Action issued in U.S. Appl. No. 12/797,758 dated Mar. 17, 2011.
European Search Report issued in EP Application No. 10012465 dated Mar. 24, 2011.
European Search Report issued in EP Application No. 10012469 dated Apr. 8, 2011.
European Search Report issued in EP Application No. 10012470 dated Apr. 8, 2011.
U.S. Office Action issued in U.S. Appl. No. 12/940,096 dated Apr. 18, 2011.
Final U.S. Office Action issued in U.S. Appl. No. 12/639,859 dated Apr. 27, 2011.
European Search Report issued in EP Application No. 10012468 dated May 4, 2011.
Final U.S. Office Action issued in U.S. Appl. No. 12/940,138 dated May 20, 2011.
U.S. Final Office Action issued in U.S. Appl. No. 12/639,894 dated Aug. 3, 2011.
U.S. Final Office Action issued in U.S. Appl. No. 12/985,389 dated Aug. 8, 2011.
U.S. Final Office Action issued in U.S. Appl. No. 12/940,096 dated Sep. 8, 2011.
Summons to Attend Oral Proceedings issued in EP Application No. 03013411.8 dated Jul. 14, 2011.
Office Action issued in U.S. Appl. No. 13/116,059 dated Nov. 28, 2011.
Office Action issued in U.S. Appl. No. 13/116,096 dated Nov. 29, 2011.
Office Action issued in U.S. Appl. No. 13/116,114 dated Nov. 29, 2011.
Office Action issued in U.S. Appl. No. 13/116,077 dated Nov. 30, 2011.
Office Action issued in U.S. Appl. No. 13/116,089 dated Nov. 30, 2011.
Office Action issued in U.S. Appl. No. 13/116,159 dated Nov. 30, 2011.
Office Action issued in U.S. Appl. No. 13/116,147 dated Nov. 30, 2011.
Office Action issued in U.S. Appl. No. 13/116,105 dated Dec. 1, 2011.
European Search Report issued in EP Application No. 10012475.9 dated Dec. 13, 2012.
European Search Report issued in EP Application No. 10012609.3 dated Dec. 13, 2012.
European Search Report issued in EP Application No. 10012611.9 dated Dec. 20, 2012.
U.S. Office Action issued in U.S. Appl. No. 12/267,457 dated Dec. 14, 2012.
U.S. Office Action issued in U.S. Appl. No. 13/239,476 dated Jan. 9, 2013.
European Office Action issued in EP Application No. 10 012 465.0-2314 dated Dec. 7, 2011.
Office Action issued in U.S. Appl. No. 13/241,366 dated Jan. 31, 2012.
Notice of Allowance issued in U.S. Appl. No. 13/239,439 dated Feb. 9, 2012.
Notice of Allowance issued in U.S. Appl. No. 13/239,448 dated Feb. 10, 2012.
Office Action issued in U.S. Appl. No. 13/241,366 dated Feb. 10, 2012.
Office Action issued in U.S. Appl. No. 13/241,348 dated Februay 23, 2012.
Office Action issued in U.S. Appl. No. 13/239,424 dated Feb. 29, 2012.
Office Action issued in U.S. Appl. No. 13/241,411 dated Mar. 6, 2012.
Office Action issued in U.S. Appl. No. 13/239,427 dated Mar. 21, 2012.
Office Action issued in U.S. Appl. No. 13/241,337 dated Mar. 22, 2012.
Office Action issued in U.S. Appl. No. 13/239,416 dated Apr. 12, 2012.
Office Action issued in U.S. Appl. No. 13/116,089 dated Apr. 13, 2012.
Office Action issued in U.S. Appl. No. 13/116,077 dated Apr. 16, 2012.
Office Action issued in U.S. Appl. No. 13/116,096 dated Apr. 16, 2012.
Office Action issued in U.S. Appl. No. 13/116,114 dated Apr. 18, 2012.
Office Action issued in U.S. Appl. No. 13/116,159 dated Apr. 18, 2012.
Office Action issued in U.S. Appl. No. 13/239,430 dated May 4, 2012.
Office Action issued in U.S. Appl. No. 13/239,422 dated May 9, 2012.
Final Office Action issued in U.S. Appl. No. 13/241,348 dated Jun. 25, 2012.
Final Office Action issued in U.S. Appl. No 13/241,366 dated Jun. 26, 2012.
Final Office Action issued in U.S. Appl. No. 13/241,396 dated Jun. 27, 2012.
Supplemental Notice of Allowability issued in U.S. Appl. No. 13/239,424 dated Jul. 10, 2012.
Non-Final Office Action issued in U.S. Appl. No. 13/239,410 dated Jul. 19, 2012.
Final Office Action issued in U.S. Appl. No. 13/241,337 dated Sep. 18, 2012.
Final Office Action issued in U.S. Appl. No. 13/116,096 dated Feb. 20, 2013.
Non Final Office Action issued in U.S. Appl. No. 13/239,523 dated Feb. 21, 2013.
Non Final Office Action issued in U.S. Appl. No. 12/639,859 dated Mar. 11, 2013.
U.S. Office Action issued in U.S. Appl. No. 12/985,389 dated Apr. 1, 2013.
U.S. Office Action issued in U.S. Appl. No. 13/239,547 dated Apr. 18, 2013.
U.S. Office Action issued in U.S. Appl. No. 12/267,457 dated Apr. 22, 2013.
U.S. Office Action issued in U.S. Appl. No. 12/940,138 dated Apr. 30, 2013.
U.S. Office Action issued in U.S. Appl. No. 13/241,396 dated May 15, 2013.
U.S. Office Action issued in U.S. Appl. No. 13/241,348 dated May 28, 2013.
U.S. Office Action issued in U.S. Appl. No. 13/239,576 dated Jun. 5, 2013.
U.S. Office Action issued in U.S. Appl. No. 13/239,407 dated Jun. 10, 2013.
U.S. Office Action issued in U.S. Appl. No. 13/239,603 dated Jun. 12, 2013.
U.S. Office Action issued in U.S. Appl. No. 12/639,859 dated Jun. 14, 2013.

(56) References Cited

OTHER PUBLICATIONS

U.S. Office Action issued in U.S. Appl. No. 13/239,413 dated Jun. 26, 2013.
Non-Final Office Action issued in U.S. Appl. No. 13/116,096 dated Sep. 21, 2012.
U.S. Office Action issued in U.S. Appl. No. 13/239,603 dated Sep. 27, 2013.
U.S. Notice of Allowance issued in U.S. Appl. No. 12/940,138 dated Oct. 2, 2013.
U.S. Notice of Allowance issued in U.S. Appl. No. 13/116,096 dated Oct. 22, 2013.
U.S. Office Action issued in U.S. Appl. No. 13/239,492 dated Oct. 23, 2013.
U.S. Office Action issued in U.S. Appl. No. 13/239,547 dated Nov. 22, 2013.
U.S. Final Office Action issued in U.S. Appl. No. 13/239,407 dated Nov. 22, 2013.
U.S. Office Action issued in U.S. Appl. No. 13/239,476 dated Jun. 28, 2013.
U.S. Office Action issued in U.S. Appl. No. 13/239,565 dated Jul. 10, 2013.
U.S. Office Action issued in U.S. Appl. No. 13/239,481 dated Aug. 9, 2013.
U.S. Office Action issued in U.S. Appl. No. 13/239,590 dated Aug. 20, 2013.
U.S. Office Action issued in U.S. Appl. No. 13/239,547 dated Sep. 4, 2013.
U.S. Office Action issued in U.S. Appl. No. 13/940,096 dated Sep. 5, 2013.
U.S. Office Action issued in U.S. Appl. No. 13/239,513 dated Sep. 6, 2013.
U.S. Office Action issued in U.S. Appl. No. 13/239,413 dated Dec. 24, 2013.
U.S. Notice of Allowance issued in U.S. Appl. No. 13/239,576 dated Dec. 27, 2013.
U.S. Final Office Action issued in U.S. Appl. No. 13/239,513 dated Jan. 3, 2014.
U.S. Notice of Allowance issued in U.S. Appl. No. 13/239,565 dated Jan. 6, 2014.
U.S. Final Office Action issued in U.S. Appl. No. 13/239,481 dated Jan. 28, 2014.
U.S. Final Office Action issued in U.S. Appl. No. 13/239,590 dated Feb. 10, 2014.
U.S. Final Office Action issued in U.S. Appl. No. 12/940,096 dated Feb. 28, 2014.
U.S. Notice of Allowance issued in U.S. Appl. No. 13/239,547 dated Mar. 19, 2014.
U.S. Office Action issued in U.S. Appl. No. 13/239,407 dated Mar. 20, 2014.
U.S. Office Action issued in U.S. Appl. No. 13/239,513 dated Apr. 7, 2014.
U.S. Final Office Action issued in U.S. Appl. No. 12/940,096 dated Jun. 4, 2014.
Cahn, Arno (Editor): *Proceedings of the $4^{th}$ World Conference on Detergents: Strategies for the $21^{st}$ Century*; Champaign, IL: AOCS Press; © 1999; Mueller-Kirschbaum, Thomas H. and Eduard J. Smulders; "Facing Future Challenges—European Laundry Products on the Threshold of the Twenty-First Century"; Dusseldorf, Germany; pp. 93-94.
European Office Action issued in Application No. 09 178 914.9 dated Aug. 1, 2014.
European Search Report issued in Application No. 10 185 492.5 dated Sep. 8, 2014.

DRUM-TYPE WASHING MACHINE AND BEARING HOUSING STRUCTURE THEREOF

CROSS REFERENCE TO RELATED APPLICATIONS

This application is a continuation application of U.S. application Ser. No. 12/940,096 filed Nov. 5, 2010, which is a continuation application of U.S. application Ser. No. 12/198,269 filed Aug. 26, 2008 now U.S. Pat. No. 8,434,334, which is a continuation application of U.S. application Ser. No. 11/165,332 filed Jun. 24, 2005 now U.S. Pat. No. 7,607,326, which claims the benefit of Korean Application No. 2004-56258, filed Jul. 20, 2004, which are hereby incorporated by reference as if fully set forth herein.

FIELD OF THE INVENTION

The present invention relates to a drum type washing machine, and more particularly, to a drum type washing machine in which a tub is directly connected to a cabinet, and a drum in the tub and a motor for rotating the drum are supported in the cabinet by a suspension, and a bearing housing structure thereof.

DESCRIPTION OF THE RELATED ART

A conventional drum type washing machine, as shown in FIG. 1, includes a rectangular box-shaped cabinet 1, in which a door 2 is installed to the front side thereof, a tub 3 disposed in the cabinet in the horizontal direction to accommodate washing water, a spring 5 and a damper 6 for supporting the tub 3 in the cabinet 1 and for buffering shock, a drum 8 rotatably installed in the tub 3 for washing laundry, and a motor 10 installed at the rear side of the tub 3 to rotate the drum 8.

In FIG. 1, reference numeral 21 is assigned to a gasket for preventing the washing water from leaking between the cabinet and the tub, and reference numerals 23 and 25 are assigned to a water supply and a drain device, respectively.

FIG. 2 is a partially sectional perspective view of the portion "A" in FIG. 1, and illustrates a structure in which the motor 10 is installed at the rear sides of the drum and the tub 3.

Between the motor 10 and the drum 8, a rotation shaft 12 for transmitting rotary power is installed to connect the motor 10 with the drum 8, and the drum 10 includes a hub 13 installed at the rear side thereof, to which the rotation shaft 12 is connected.

The tub 3 includes a bearing housing 14, installed at the rear side of the tub 3, through which the rotation shaft 12 penetrates, and a bearing 15 for supporting the rotation shaft 12 is installed in the bearing housing 14.

Here, the bearing housing 14 is made of steel or aluminum, such that stiffness sufficient to support the rotation shaft 12 can be maintained, and is fixed to the rear side of the tub 3 via insert molding. The bearing 15 is fixed in the bearing housing 14 by being compulsorily tightly fitted against the bearing housing 14.

The motor 10 is an abduction motor in which a stator 10S is positioned at the center of the motor 10 and a rotor 10r is positioned around the stator 10S, wherein the stator 10S is assembled with and fixed to the bearing housing 14 by bolts 17 and the rotor 10R is fixed to the end of the rotation shaft 12.

However, in the conventional drum type washing machine as described above, since the drum 8 and the motor 10 are supported by the tub 3, the tub 3 is supported in the cabinet 1 by the spring 5 and the damper 6, a predetermined space between the cabinet 1 and the tub 3 is required. Thus, there is also a limit to increase the size of the drum 8 performing washing process in the cabinet 1 with a predetermined volume.

Moreover, in the conventional drum type washing machine, since the drum 8, the bearing 15, and the motor 10 are vibrated together with the tub 3, reaction force is generated by the bearing in proportion to the vibration, and a metal bearing housing 14 is fixed to the tub 3 via insert molding to securely fix the bearing 15 to the tub 3.

However, since sizes of the tub 3 and the bearing housing 14 must be changed when volume of the conventional drum type washing machine is changed, the tub 3 and the bearing housing 14 cannot be used in common, and a tub 3 and a bearing housing 14 with different sizes must be manufactured.

SUMMARY OF THE INVENTION

Therefore, the present invention has been made in view of the above and/or other problems, and it is an object of the present invention to provide a drum type washing machine in which a tub is directly installed in a cabinet and vibration elements such as a drum and a motor are directly supported in the cabinet by a suspension such that there is no need for a separate clearance between the cabinet and the tub, causing an increase in the size of the drum to maximize volume of the drum type washing machine.

It is another object of the present invention to provide a drum type washing machine in which defective parts are conveniently repaired or replaced when a tub or a bearing housing malfunctions, by installing the bearing housing separately from the tub without fixing the bearing housing to the tub by the insert-molding, and only one of the tub and the bearing housing, which is not applicable to the drum type washing machine having the changed washing capacity, is selectively replaced. Thus parts can commonly used in various drum type washing machine having different volume.

In accordance with the present invention, the above and other aspects can be accomplished by the provision of drum type washing machine including a tub installed in a cabinet, a drum, disposed in the tub, in which washing is performed, a motor disposed at the rear side of the tub to rotate the drum, bearing housings disposed between the drum and the motor and respectively having bearings to support a rotation shaft, a suspension connected to the bearing housings and the cabinet to mitigate vibration generated during the rotation of the drum, a bracket installed to the front sides of the bearing housings to form the rear side of the tub, and a gasket installed between the bracket and the tub to seal the tub and to prevent vibration from being transmitted from the bracket to the tub.

Preferably, the tub is fixed to the cabinet such that the front side of the tub is attached to the inner surface of the cabinet.

The bearing housings includes a main bearing housing fixed to the bracket, and a sub-bearing housing, coupled to the rear side of the main bearing housing, to which a stator of the motor is fixed.

The main bearing housing and the sub-bearing housing are convex in opposite directions such that the central portions of the main bearing housing and the sub-bearing housing, through which the rotation shaft penetrates, are spaced apart from each other.

The main bearing housing and the sub-bearing housing are made of pressed metal plates.

The main bearing housing has a semi-circular upper side higher than a part through which the rotation shaft penetrates, and a rectangular lower side lower than the part through which the rotation shaft penetrates.

Preferably, the sub-bearing housing is circular.

The suspension is connected to the main bearing housing.

The bracket includes a seal member, installed at the intermediate portion thereof, for preventing washing water from leaking between the bracket and the rotation shaft.

The another object of the present invention is achieved by the provision of a structure of bearing housings (76 and 78) of a drum type washing machine including a rotation shaft penetrating through a tub to connect a drum and a motor for driving the drum, a main bearing housing fixed to a portion for forming the rear side of the tub to support a rotation shaft of the motor, a sub-bearing housing coupled with the rear side of the main bearing housing to support the rotation shaft.

The main bearing housing and the sub-bearing housing are convex in opposite directions such that the central portions of the main bearing housing and the sub-bearing housing, through which the rotation shaft penetrates, are spaced apart from each other.

Preferably, the main bearing housing and the sub-bearing housing are made of pressed metal plates.

The bearing housings are supported on a cabinet farming the outer appearance of the drum type washing machine by a suspension to mitigate vibration generated during rotation of the drum.

The another object of the present invention is achieved by the provision of a drum type washing machine including a tub directly fixed in a cabinet, a drum, disposed in the tub, in which washing is performed, a motor disposed at the rear side of the tub to rotate the drum, a main bearing housing fixed to a portion for forming the rear side of the tub to support a rotation shaft of the motor, a sub-bearing housing coupled with the rear side of the main bearing housing to support the rotation shaft, and a suspension connected to the main bearing housing and the cabinet to mitigate vibration generated during the rotation of the drum.

Moreover, in the drum type washing machine according to the present invention, since the bearing housing is separated from the tub instead of being fixed to the tub by the insert molding, when one of the tub and the bearing housing malfunctions, only the malfunctioning component must be replaced. According to the present invention, when either the tub or the bearing housing of a drum type washing machine malfunctions, the malfunctioning component may be replaced using a drum or bearing housing designed for a drum type machine of a different volume. Thus, the parts are interchangeable among drum type washing machines with different volumes.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, the preferred embodiments of the drum type washing machine according to the present invention will be described in detail with reference to the accompanying drawings.

Although several embodiments of the drum type washing machines are possible according to the present invention, hereinafter, only the drum type washing machine according to the preferred embodiment of the present invention will be described.

Figure 1:
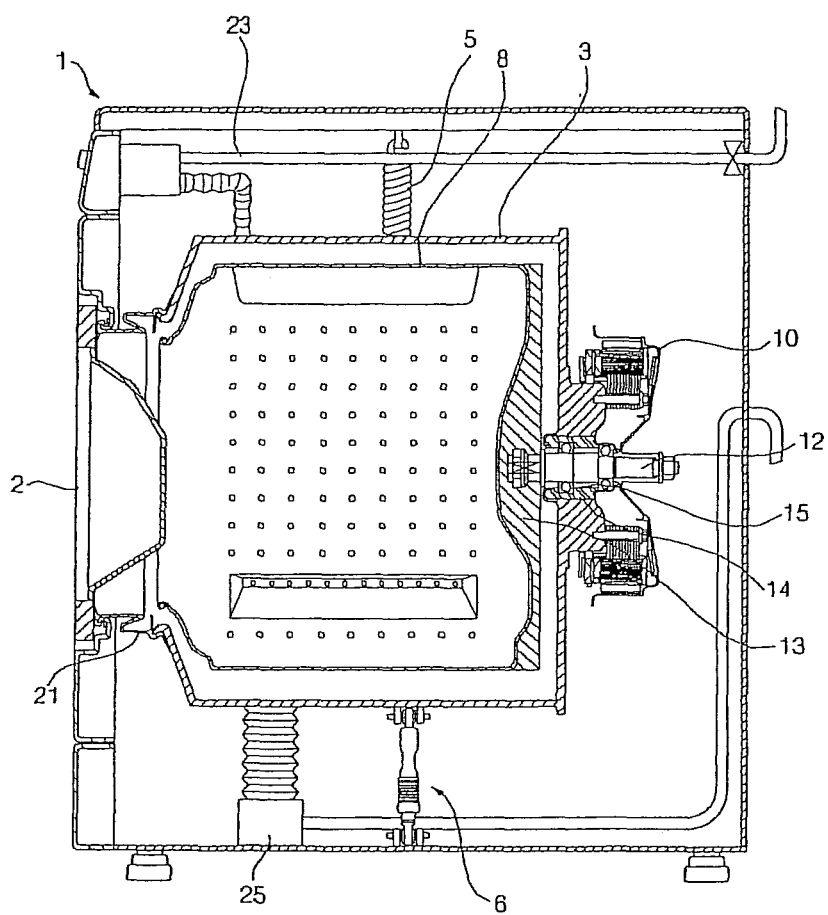
FIG. 1 is a sectional elevation view illustrating an inner structure of a conventional drum type washing machine.
Figure 2:
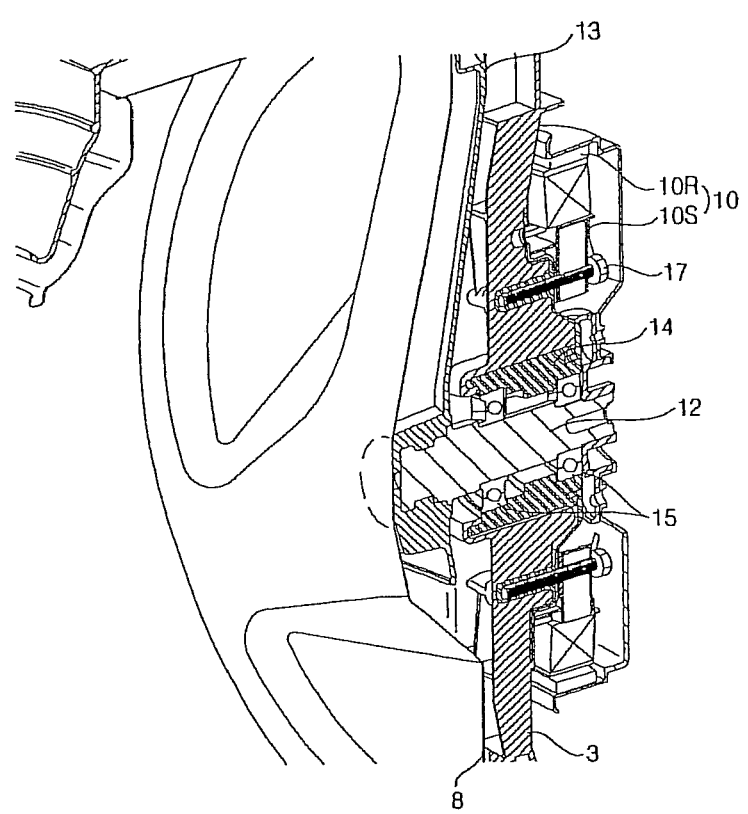
FIG. 2 is a partially sectional perspective view of a portion "A" in FIG. 1.
Figure 3:
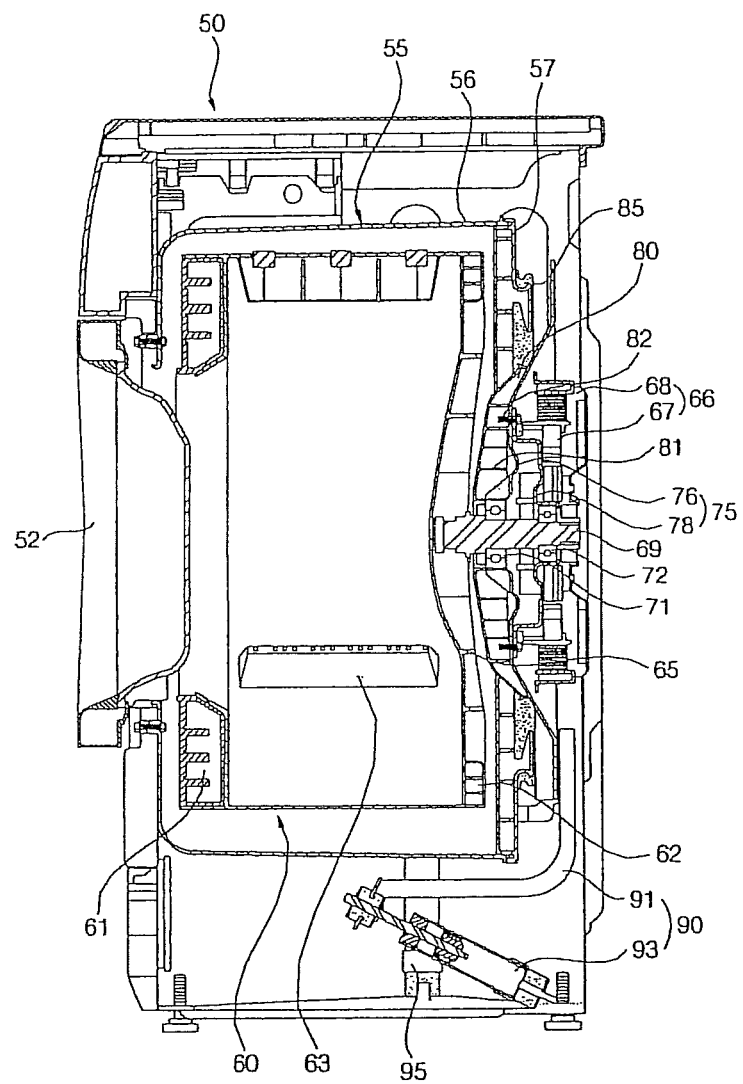
FIG. 3 is a sectional elevation view illustrating an inner structure of a drum type washing machine according to a preferred embodiment of the present invention.
Figure 4:
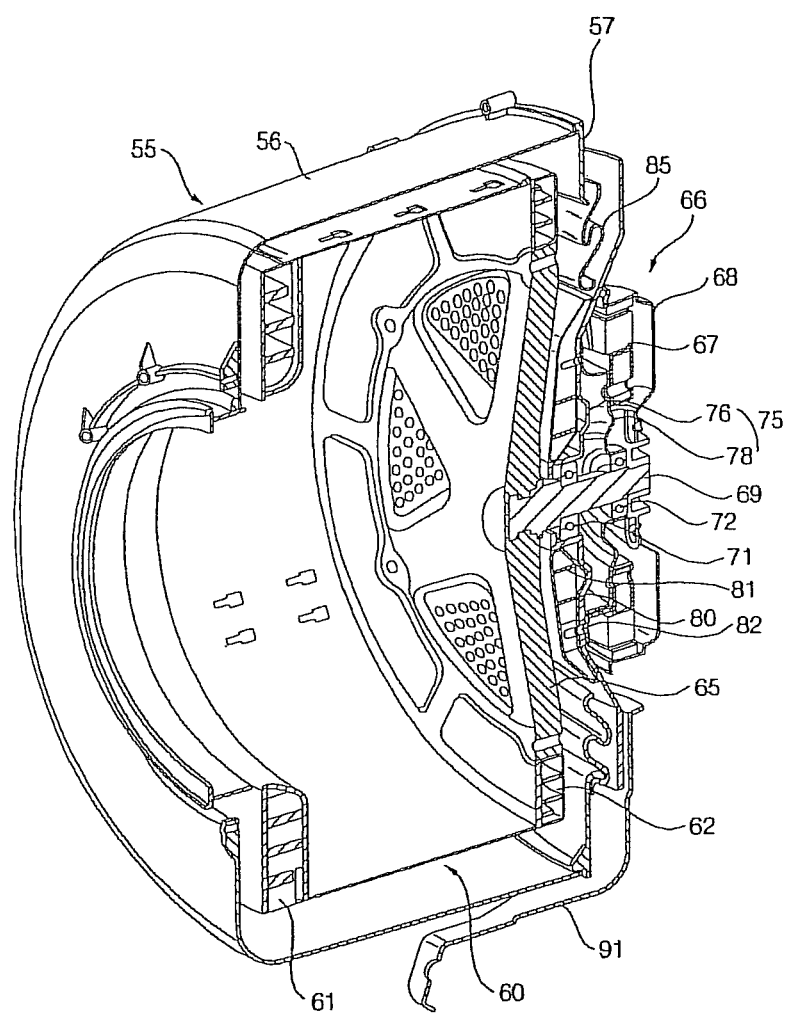
FIG. 4 is a partially sectional perspective view illustrating main parts of the drum type washing machine according to the preferred embodiment of the present invention.
Figure 5:
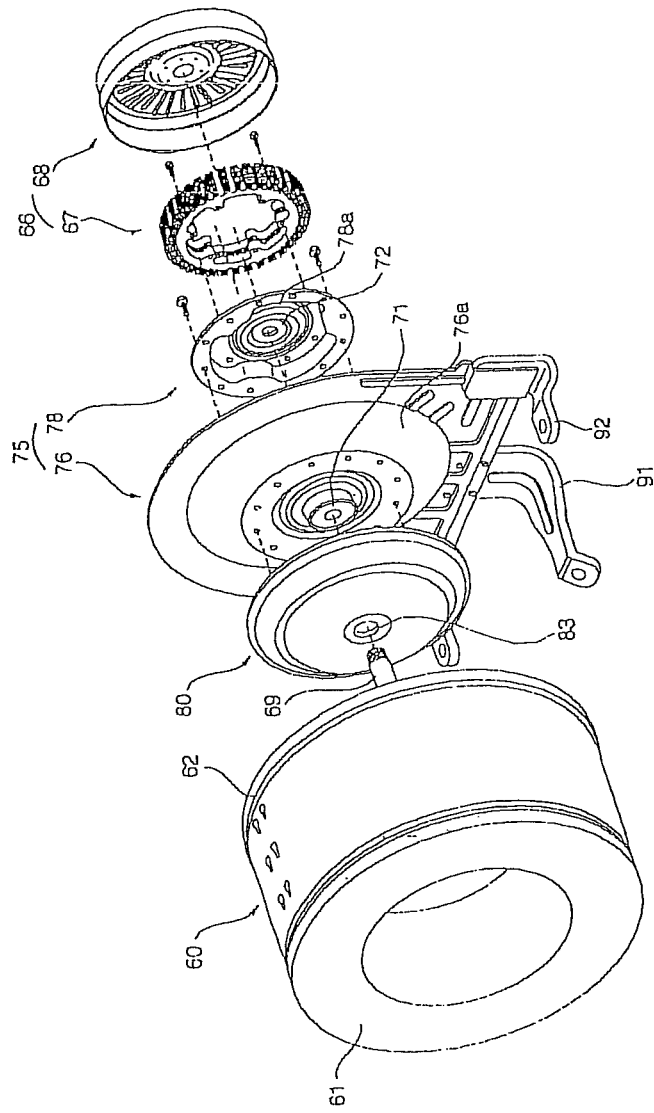
FIG. 5 is a perspective view illustrating main parts of the drum type washing machine according to the preferred embodiment of the present invention.
Figure 6:
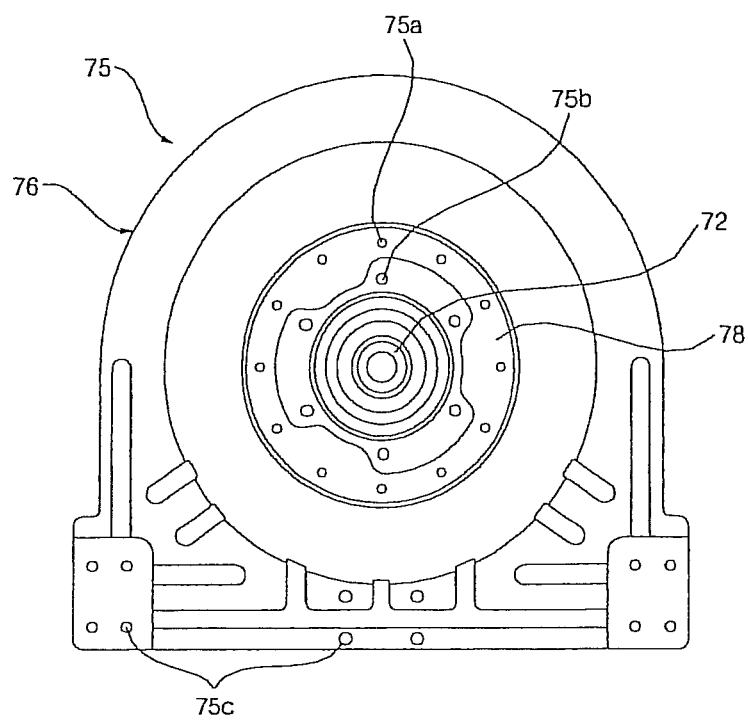
FIG. 6 is a rear side view of a bearing housing installed in the drum type washing machine according to the preferred embodiment of the present invention.

FIGS. 3 to 6 are views illustrating the drum, type washing machine according to the preferred embodiment of the present invention; FIG. 3 is a sectional elevation view illustrating an inner structure of the drum type washing machine according to the preferred embodiment of the present invention, FIG. 4 is a partially sectional perspective view illustrating main parts of the drum type washing machine according to the preferred embodiment of the present invention, FIG. 5 is a perspective view illustrating main parts of the drum type washing machine according to the preferred embodiment of the present invention, and FIG. 6 is a rear side view of a bearing housing.

The drum type washing machine according to the preferred embodiment of the present invention, as shown in FIG. 3, includes a rectangular box-shaped cabinet 50 and a tub 55 directly connected to and installed in the cabinet 50 to accommodate washing water. In other words, although, in the conventional drum type washing machine, a tub is connected to a cabinet by a spring and a damper, but in the drum type washing machine according to the preferred embodiment of the present invention, the tub 55 is directly fixed to the cabinet 50 without need for a damper.

As such, a drum 60, in which the tub 55 is directly installed and the laundry is washed, and vibration elements, such as a motor 66 for rotating the drum 60, are supported in the cabinet 50 by a suspension 90, such that vibration generated when the drum 60 is rotated can be reduced.

Especially, the drum 60 is connected to the motor 66 by a rotation shaft 69 and is rotated by the motor 66. Between the drum 60 and the motor 66, a bearing housing 75 including bearings 71 and 72 for supporting the rotation shaft 69, is installed. The suspension 90 is connected to the bearing housing 75 such that the vibration elements, such as the drum 60, the motor 66, and the like, are supported in the cabinet 50 by the bearing housing 75.

In front of the bearing housing 75, a bracket 80 is provided to form the rear side of the tub 55, and a gasket 85 installed between the bracket 80 and the rear portion of the tub 55 is installed to prevent vibration from being transmitted from the vibration elements to the tub 55 and to prevent water accommodated in the tub 55 from leaking.

Main parts of the drum type washing machine according to the preferred embodiment of the present invention, structured as described above, will be described as follows.

Preferably, the cabinet 50 takes the shape of a rectangular container like that of the conventional drum type washing machine, and has a door 52 installed at the front side thereof to open and close the tub 55.

The tub 55 includes a tub main body 56 directly fixed to the front side of the cabinet 50, and a ring-shaped tub cover 57, which is installed at the rear side of the tub main body 56 and includes an intermediate part where the bracket 80 and the rear gasket 85 are positioned.

The drum 60 is supported, by connecting the rear part of the drum 60 to the rotation shaft 69, and has a hub 65 to which the rotation shaft 69 is connected. The drum 60 includes a plurality of lifts 63 installed at the inner side thereof to raise and release the laundry in the drum 60. The drum 60 further includes balancers 61 and 62 installed at the front and rear sides of the drum 60 to balance the drum 60 during the rotation of the drum 60.

The motor 66 is an abduction motor and is mounted at the rear side of the bearing housing 75 such that a stator 67 is coupled with the bearing housing 75 by bolts and a rotor 68 is coupled with the rotation shaft 69 by bolts.

Especially, the bearing housing 75, as shown in FIG. 5, includes a main bearing housing 76 in which the bracket 80 is fixed, and a sub-bearing housing 78 smaller than the main bearing housing 76 and coupled with the rear side of the main bearing housing 76 by bolts, in which the motor 66 is fixed.

Here, the main bearing housing 76 has a semi-circular upper side higher than a part through which the rotation shaft 69 penetrates, and a rectangular lower side lower than the part through which the rotation shaft 69 penetrates such that damper brackets 91 and 92 of the suspension 90 are connected to the lower side.

The circular sub-bearing housing 78 is similar in size to the stator 67 of the motor 66.

The main bearing housing 76 and the sub-bearing housing 78 are convex in opposite directions to form a predetermined space therebetween. Thus, since the central portions of the bearing housings 76 and 78, through which the rotation shaft 69 penetrates, are spaced apart from each other, the two bearings 71 and 72, which are tightly fitted against the central portions of the bearing housings 76 and 78, are fixed at a predetermined distance. Moreover, the bracket 80 and the stator 67 of the motor 66 closely contact and are fixed to the convex portions 76a and 78a of the bearing housings 76 and 78 by bolts, respectively.

The bearing housing 75 is preferably manufactured by drawing the convex portions 76a and 78a using a steel plate press.

Next, the bracket 80 is made of non-oxidizable synthetic resin and prevents water from entering the bearing housing 75 through the front side of the bearing housing 75. The bracket 80 includes a water seal 83, installed at the intermediate portion thereof and serving as a seal member, for preventing washing water from leaking between the bracket 80 and the rotation shaft 69.

The bracket 80 includes a plurality of radial shaped or lattice-shaped ribs 81 to reinforce the bracket 80 and bolt holes 82 to couple the bracket 80 to the bearing housing 75 using bolts.

In FIG. 6, reference numeral 75a is assigned to bolt holes, communicated from the bolt hole of the main bearing housing 76 and the sub-bearing housing 78 to bolt holes 82 of the bracket 80, through which bolts are fastened, and reference numeral 75b is assigned to bolt holes to couple the stator 67 using bolts, and reference numeral 75c is assigned to couple damper brackets 91 and 92 using bolts.

Meanwhile, in the suspension 90, dampers 93 and 95 are installed between the damper brackets 91 and 92 connected to the main bearing housing 76 and a base of the cabinet 50, in which a main damper 93, positioned between the damper bracket 91 and the damper 95 as seen in FIG. 3, between the damper brackets 91 and 92 and the base of the cabinet 50, is installed at an angle, and sub-dampers 95, positioned at both sides of the main damper 93, are vertically installed to absorb vibration generated by the vibration elements.

Operation of the drum type washing machine having the structure as described above according to the preferred embodiment of the present invention will be described as follows.

According to the drum type washing machine in accordance with the preferred embodiment of the present invention, since the tub 55 is directly installed to the cabinet 50, the size of the tub 55 can be increased when the cabinet 50 has the same volume as that of the cabinet in the conventional drum type washing machine. Thus, since the drum 60 installed in the tub 55 can also be relatively increased in size, the washing capacity of the drum type washing machine according to the preferred embodiment of the present invention can be increased without increase of the size of the cabinet 50.

The assembly of the drum type washing machine according to the preferred embodiment of the present invention will be described with respect to the bearing housing 75 as follows. First, the main bearing housing and the sub-bearing housing 78, in which the bearings 71 and 72 are respectively installed, contact each other and are assembled by bolts.

The bracket 80, in which the water seal 83 is installed, is coupled with the front side of the assembly of the main bearing housing 76 by bolts, and the stator 67 of the motor 66 is coupled with the rear side of the sub-bearing housing 78 by bolts.

As such, after assembling the bracket 80, the bearing housing 75, and the stator 67, the rotation shaft 69 connected to the hub 62 of the drum 60 penetrates the water seal 83 of the bracket 80, the bearings 71 and 72 of the bearing housing 75, and the stator 67, and then the rotor 68 is coupled with an end of the penetrating rotation shaft 69.

Meanwhile, after the suspension 90 is connected to the bearing housing 75, the drum 60 is inserted into the rear side of the tub 55 directly fixed to the cabinet 50 and the suspension 90 is fixed to the base of the cabinet 50, so that the bracket 80, the bearing housing 75, and the motor 66, which are coupled with the drum 60, are installed in the cabinet 50.

Subsequently, the tub 55 and the bracket 80 are connected to each other via the gasket 85 so that assembly of the main parts of the drum type washing machine according to the preferred embodiment of the present invention is completed.

In the assembly of the drum type washing machine according to the preferred embodiment of the present invention as described above, since the bearing housing 75 is not installed to the tub by insert-molding, but can be separated from the tub, the bearing housing 75 can be installed in a drum type washing machine having a difference volume.

Moreover, since the bracket 80 is made of synthetic resin including plastic and is installed to the front side of the metal bearing housing 75 such that the bracket 80 and the gasket 85 form the rear side of the tub 55, the bearing housing 75 is not easily eroded due to water even after extended use. Since the water seal 83 is installed at the intermediate portion of the bracket 80, water is prevented from leaking so that the bearings 71 and 72 and the bearing housing 75 are prevented from being damaged.

As described above, according to the drum type washing machine of the present invention, since the tub is directly installed to the cabinet and the vibration elements, such as the drum, the motor, and the like, are supported on the cabinet by the suspension, volumes of the tub and the drum can be easily increased and the tub and the drum having the increased volumes can be installed in the cabinet without increasing the volume of the cabinet.

Moreover, in the drum type washing machine according to the present invention, since the bearing housing is separated from the tub instead of being fixed to the tub by the insert molding, when one of the tub and the bearing housing malfunctions, only the malfunctioning component must be replaced. According to the present invention, when either the tub or the bearing housing of a drum type washing machine malfunctions, the malfunctioning component may be replaced using a drum or bearing housing designed for a drum type machine of a different volume. Thus, the parts are interchangeable among drum type washing machines with different volumes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0056258, filed on Jul. 20, 2004, the contents of which are herein expressly incorporated by reference in its entirety.

What is claimed is:

1. A drum type washing machine, comprising:
a tub that holds washing fluid therein, the tub having a front opening formed at a front axial end thereof that receives laundry therethrough and a rear opening formed at a rear axial end thereof;
a drum rotatably installed in the tub, the drum having an opening formed at a front axial end thereof that receives laundry therethrough;
a driving assembly, comprising:
a shaft coupled to a rear axial end of the drum;
a motor to rotate the shaft; and
a bearing housing that rotatably supports the shaft;
a tub bracket positioned at the rear opening of the tub;
a gasket connected between an inner peripheral portion of the rear opening of the tub and an outer peripheral portion of tub bracket to prevent water inside the tub from leaking toward the driving assembly and to allow the driving assembly to move relative to the tub; and
a suspension coupled to the bearing housing, the suspension supporting the drum at at least two different locations which are spaced apart from each other along a longitudinal direction of the drum, wherein the suspension comprises:
at least two vertical dampers supporting a vertical load of the drum and the driving assembly and damping vibration generated in a radial direction of the drum; and
at least one inclined damper that is inclined with respect to a longitudinal direction of the drum to damp vibration generated in the longitudinal direction of the drum.

2. The drum type washing machine of claim 1, wherein the at least two vertical dampers comprises:
first and second vertical dampers that are coupled to the bearing housing at two opposite lateral sides of a rotational axis of the shaft and oriented vertically.

3. The drum type washing machine of claim 1, wherein the at least two vertical dampers comprises:
at least two vertical dampers coupled to the bearing housing at a position below the shaft and oriented vertically.

4. The drum type washing machine of claim 1, wherein the at least one inclined damper is coupled to a lower center portion of the bearing housing.

5. The drum type washing machine of claim 1, wherein the suspension is coupled to a portion of the bearing housing that is below the shaft so as to support the drum and the driving assembly from under the drum such that the drum and the driving assembly remain in a position in a non-operational state.

6. The drum type washing machine of claim 5, wherein the at least two vertical dampers comprises three dampers each coupled to the portion of the bearing housing below the shaft, wherein the three dampers support the drum at the at least two different locations which are spaced apart from each other along the longitudinal direction of the drum.

7. The drum type washing machine of claim 6, wherein a first and second damper of the three dampers are positioned at the same longitudinal location along the longitudinal direction of the drum, positioned on opposite sides of the shaft, and a third damper of the three dampers is positioned at another longitudinal location along the longitudinal direction of the drum.

8. The drum type washing machine of claim 1, wherein the suspension further comprises:
a plurality of damper brackets coupled to the bearing housing, wherein the at least two vertical dampers and the at least one inclined damper are respectively coupled to the plurality of damper brackets so as to support the drum.

9. The drum type washing machine of claim 8, wherein the plurality of damper brackets extend at least partially in an axial direction with respect to the shaft.

10. The drum type washing machine of claim 9, wherein the plurality of damper brackets are positioned at a plurality of circumferential positions of the tub.

11. The drum type washing machine of claim 1, wherein the tub is fixed directly to a cabinet or formed integrally with the cabinet, and the suspension supports the drum within the tub separately from the tub.

* * * * *